United States Patent
Orozco

(10) Patent No.: US 7,562,830 B2
(45) Date of Patent: Jul. 21, 2009

(54) TEMPERATURE CONTROLLER

(75) Inventor: Sergio Orozco, Tijuana (MX)

(73) Assignee: Crydom Technologies, George Town (KY)

( * ) Notice: Subject to any disclaimer, the term of this patent is extended or adjusted under 35 U.S.C. 154(b) by 569 days.

(21) Appl. No.: 11/227,819

(22) Filed: Sep. 15, 2005

(65) Prior Publication Data

US 2007/0057076 A1  Mar. 15, 2007

(51) Int. Cl.
*G05D 23/12* (2006.01)

(52) U.S. Cl. .................. 236/1 C; 361/161; 374/170

(58) Field of Classification Search .............. 236/1 C, 236/78 A, 91 R; 361/161, 165; 363/16; 374/170

See application file for complete search history.

(56) References Cited

U.S. PATENT DOCUMENTS 3,849,705 A * 11/1974 McElroy ................. 361/36
4,429,829 A * 2/1984 Dutton ..................... 236/78 B
5,570,276 A * 10/1996 Cuk et al. ................. 363/16

* cited by examiner

*Primary Examiner*—Marc E Norman
(74) *Attorney, Agent, or Firm*—Peter F. Weinberg; Gibson, Dunn & Crutcher LLP

(57) ABSTRACT

A temperature controller that combines a solid state relay with internal circuitry that generates temperature control output for heating element loads or cooling compressor loads ranging from 24VAC up to 530VAC and at 25A up to 90A. A logic supply and control connectors provides connectors for various inputs. Power switch terminals connect the temperature controller to the heating element or cooling motor to be temperature controlled. Thermocouple terminals receive the leads from a type J or type K thermocouple from the heating element or cooling motor. The temperature controller rapidly and accurately senses, controls, and maintains the temperature of any process associated with a load. The temperature control output signal leaving the power switch controls the load in order to maintain a constant temperature delivered to the process. The temperature controller requires only a single non-regulated low current isolated DC supply to work the logic circuitry.

15 Claims, 6 Drawing Sheets

TEMPERATURE CONTROLLER

FIELD OF THE INVENTION

This invention relates to temperature controllers, and more particularly to a temperature controller coupled with a solid state relay in one assembly for controlling heating loads or cooling compressor loads.

DETAILED DESCRIPTION OF THE INVENTION

Figure 1:
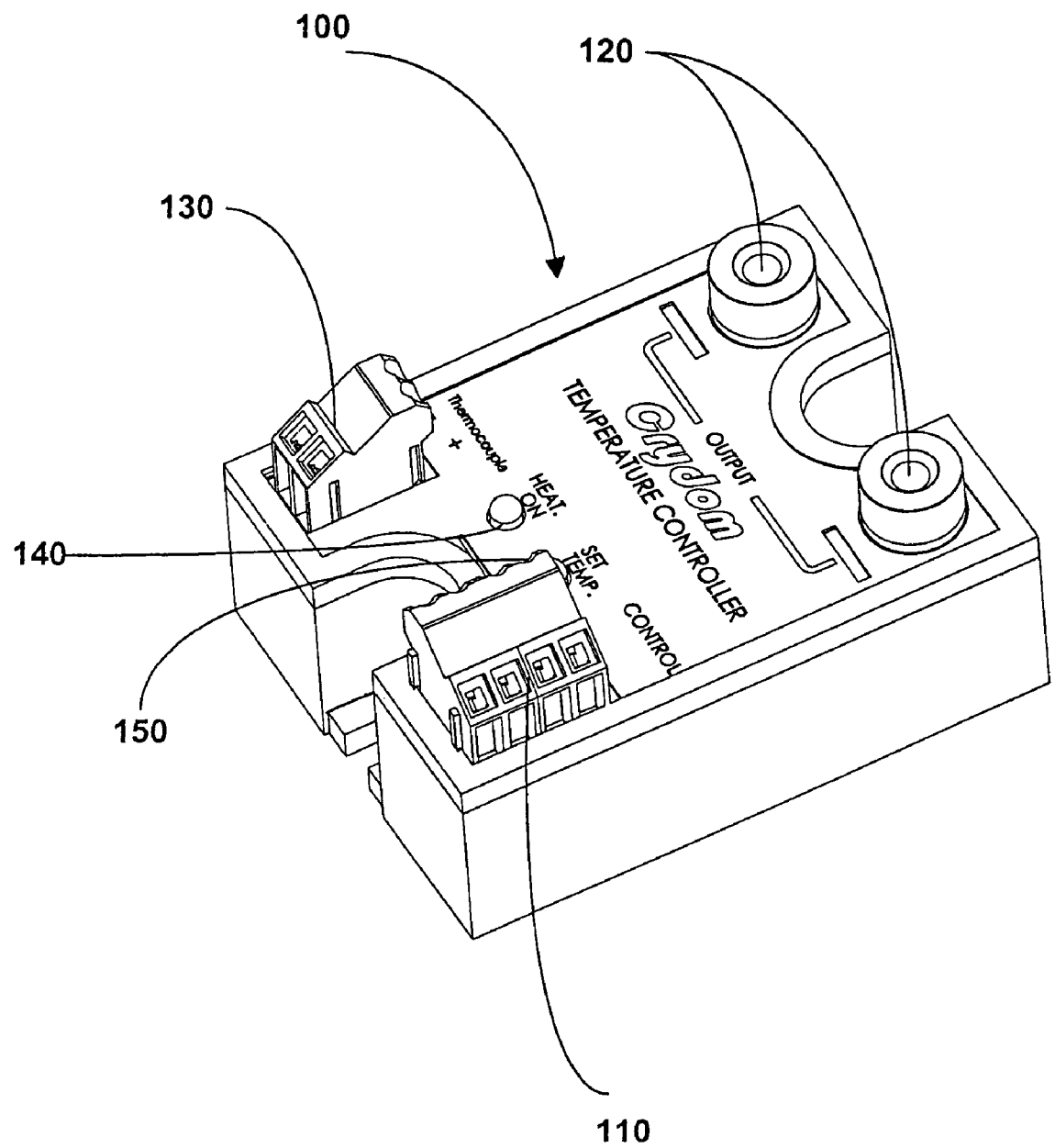
FIG. 1 shows a perspective view of an embodiment of the temperature controller of the present invention.

Referring to the Figures, in which like reference numerals and names refer to structurally and/or functionally similar elements thereof, FIG. 1 shows perspective view of an embodiment of the temperature controller of the present invention. Referring now to FIG. 1, Temperature Controller 100 is a unique self-contained state of the art basic temperature controller that combines all the necessary functions into one easy to set up and use standard size package. Typical applications for Temperature Controller 100 include plastics processing, heat treating, drying ovens, food processing, petroleum/chemical processes, furnaces and ovens, and various cooling processes. Temperature Controller 100 is ideal for users of temperature controllers that do not need multiple built-in options, displays, and functions that, if present, would never be used. Temperature Controller 100 has all the features of a solid state relay and a basic temperature controller with isolated power output in a standard package.

Temperature Controller 100 is a solid state relay with internal circuitry that generates temperature control output for heating element loads or cooling compressor loads ranging from 24 VAC up to 530 VAC and at 25 A up to 90 A. Logic Supply and Control Connectors 110 provide for various inputs described in more detail in relation to FIG. 2. Power Switch Terminals 120 connect Temperature Controller 100 to the heating element or cooling motor to be temperature controlled. Thermocouple Terminals 130 receive the leads from a type J or type K thermocouple from the heating element or cooling motor. Heat-On Indicator 140 is a light emitting diode ("LED") and is typically red in color. Set-Temp Indicator 150 is also an LED and is typically green in color.

Figure 2:
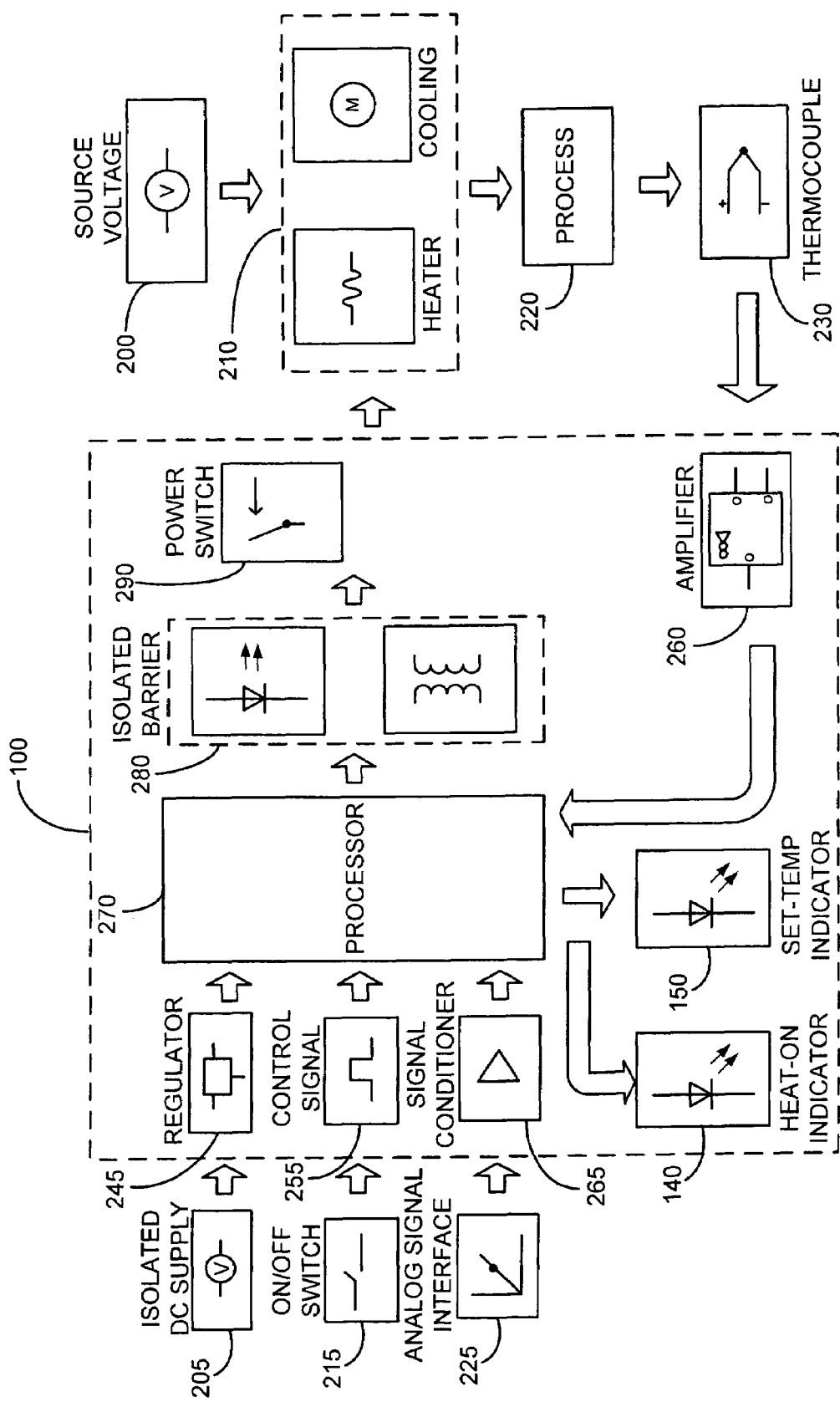
FIG. 2 shows a functional schematic/block diagram of an embodiment of the temperature controller of the present invention.

FIG. 2 shows a functional schematic/block diagram of an embodiment of the temperature controller of the present invention. Referring now to FIG. 2, Temperature Controller 100 is a general purpose self-contained solid state relay and temperature controller that rapidly and accurately senses, controls, and maintains the temperature of any Process 220 associated with a Load 210, which is typically a heating element or a cooling compressor, and powered by Source Voltage 200. Temperature Controller 100 requires only a single non-regulated low current Isolated DC Supply 205 to work the logic circuitry of Regulator Circuit 245, Control Signal Circuit 255, and Signal Conditioner Circuit 265 from Logic Supply and Control Connectors 110 (FIG. 1). Temperature Controller 100 allows a user to enable/disable via On/Off Switch 215 the Power Switch Circuit 290 output of Temperature Controller 100, preset a desired temperature using an Analog Signal Interface 225, and uses a Thermocouple 230 attached to the controlled Process 220. Thermocouple 230 produces an input signal that is amplified and conditioned through Amplifier Circuit 260 that is used by Processor 270 to calculate both derivative gain and proportional gain, or an on/off feature to produce an output signal, such that Temperature Controller 100 responds quickly and accurately to both the amount of temperature change and to the rate of temperature change. The output signal leaving Power Switch Circuit 290 then controls Load 210 in order to maintain a constant temperature delivered to Process 220.

Temperature Controller 100 also has Isolated Barrier Circuit 280 between the output signal from Processor 270 and Power Switch Circuit 290 which allows Temperature Controller 100 to be used with high voltage/current loads. The embodiment of the invention shown in FIG. 2 uses silicon controlled rectifiers in back-to-back configuration for AC applications (see FIG. 3), but is not limited to this. Temperature Controller 100 can control DC loads using a power transistor or mosfet, or other appropriate means. Temperature Controller 100 as shown in FIG. 2 uses optical isolation but is not limited to this. Temperature Controller 100 can also use a transformer instead of the photocouplers of Isolated Barrier Circuit 280. Heat-On Indicator 140 and Set-Temp Indicator 150 are used in setting up Temperature Controller 100 and to indicate current status once in operation, described more fully in relation to FIG. 4 and FIG. 7 below.

Figure 3:
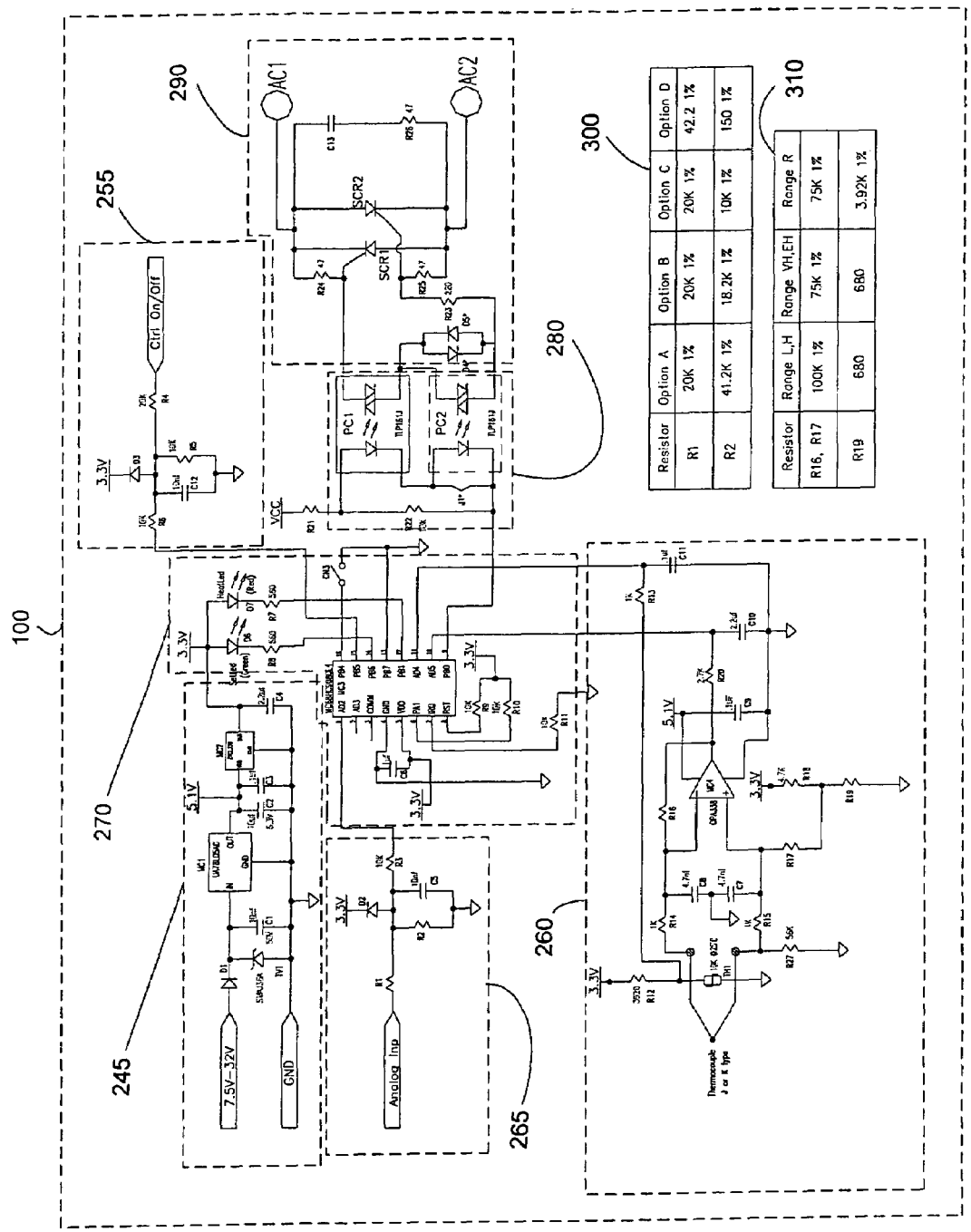
FIG. 3 shows a circuit diagram of an embodiment of the temperature controller of the present invention.

FIG. 3 shows a circuit diagram of an embodiment of the temperature controller of the present invention. Referring now to FIG. 3, Table 300 shows the four options for setpoint input. The three voltage options are: Option A, 0-5VDC; Option B, 0-7 VDC; and Option C, 0-10 VDC. Option D uses a 4-20 mA current for input. Table 300 shows the corresponding values in ohms for Resistors R1 and R2 (Signal Conditioner Circuit 265) for each option.

Table 310 shows the four heating ranges available with burst fire control for Temperature Controller 100 and the one refrigeration range. The four heating ranges are: Range L, 100-500° F.; Range H, 300-700° F.; Range VH, 500-900° F.; and Range EH, 700-1100° F. The one available refrigeration Range R, from 100° F. down to −100° F., has a built-in two minute short-cycle protection which for every cycle delays for two minutes turning the compressor back on after it has shut off to prevent the compressor from overload. Table 310 shows the values in ohms of resistors R16, R17, and R19 (Amplifier Circuit 260) required for each of the ranges.

Figure 5:
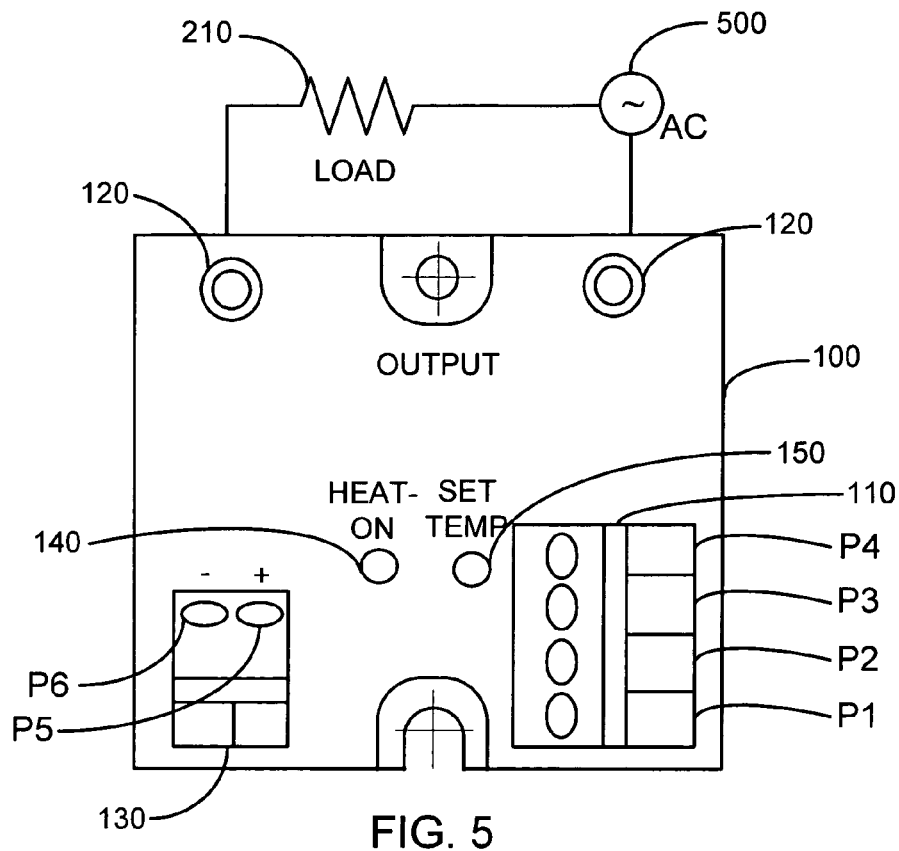
FIG. 5 shows a typical electrical connection to a load and AC power source of an embodiment of the temperature controller of the present invention.

FIG. 5 shows a typical electrical connection to a load and AC power source of an embodiment of the temperature controller of the present invention. Referring now to FIG. 5, Load 210 and AC Power Supply 500 are connected to Power Switch Terminals 120, which must be connected in series with the heating element or cooling compressor Load 210. Thermocouple Terminals 130 have positive input terminal P5 and negative input terminal P6 for receiving the leads from a type J or type K thermocouple from the heating element or cooling motor Load 210. The direct type J or type K input is internally compensated thermocouple input. Temperature Controller 100 is not limited to only these kinds of thermocouples, but can also utilize types E, N, S, and T thermocouples, as well as thermistors and resistance temperature detectors ("RTDs"). Logic Supply and Control Connectors 110 has input terminals P1, P2, P3, and P4, described more fully in reference to FIG. 6 below.

Figure 6:
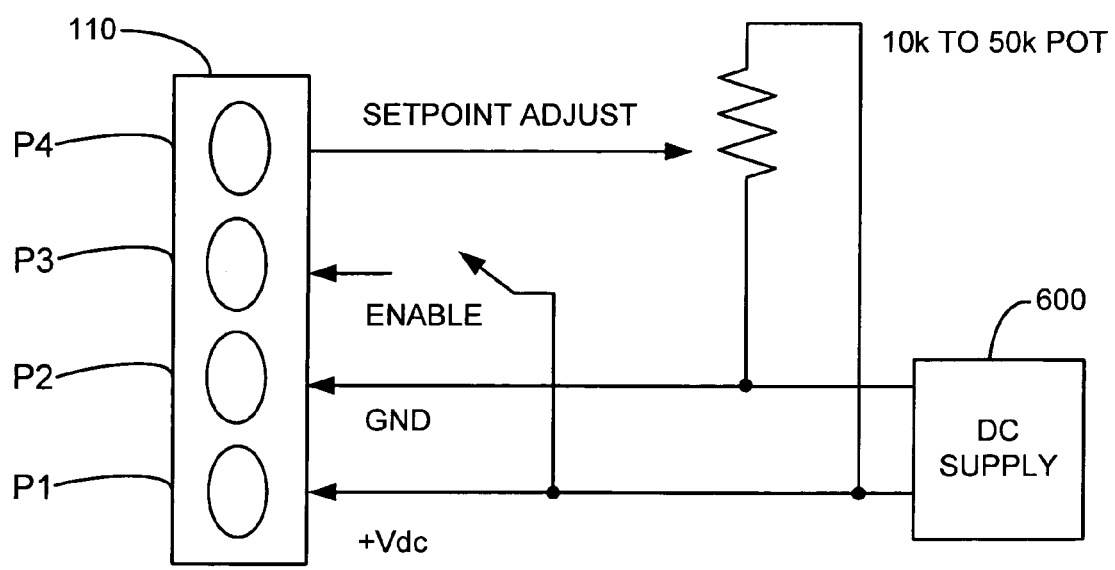
FIG. 6 shows a typical input wiring diagram in an embodiment of the temperature controller of the present invention.

FIG. 6 shows a typical input wiring diagram in an embodiment of the temperature controller of the present invention. Referring now to FIG. 6, setup for Temperature Controller 100 begins by connecting a DC Supply 600 between terminal P1(+) and ground terminal P2(−) in the range of 8 to 32VDC. Temperature Controller 100 is designed to operate on 12V or 24V power supplies, but can also be configured to operate on a 9VDC AC adapter. Temperature Controller 100 has On/Off Switch Input at terminal P3. To simplify the external circuit the On/Off Switch Input is attached to the DC Supply 600 terminal to run at startup, or used as normal input. The On/Off voltages are defined on input specifications.

Setpoint input at terminal P4 can be configured as a voltage or current input depending upon the option selected. If adjusted by voltage, an external potentiometer or voltage supply may be used from terminal P4 to ground terminal P2(−). High input impedance is used for the voltage option. If a current is used as input for adjustment, a low input impedance is used. Current supply must be provided and the return path is referenced to ground terminal P2(−).

The leads from the thermocouple must be connected according to their polarity as indicated on the cover of Temperature Controller 100 (P5(+) and P6(−)). Temperature Controller 100 has an open thermocouple protection feature. Logic Supply and Control Connectors 110 have reverse polarity protected input connections.

Figure 4:
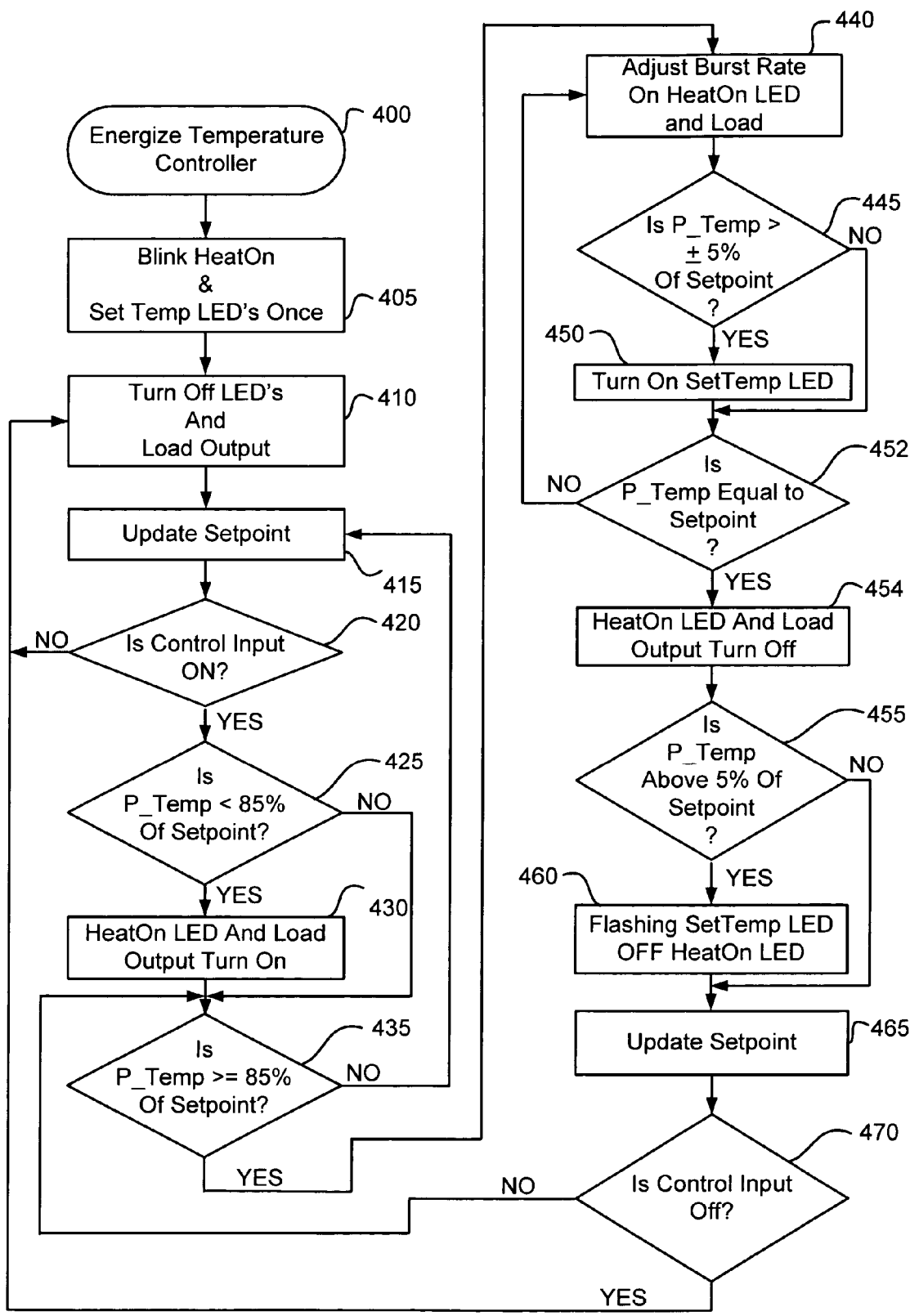
FIG. 4 shows a functional flowchart of an embodiment of the temperature controller for a heat element load of the present invention.

FIG. 4 shows a functional flowchart of an embodiment of the temperature controller for a heat element load of the present invention. Referring now to FIG. 4, in Step 400 Temperature Controller 100 is energized. This causes Heat-On Indicator 140 and Set-Temp Indicator 150 to flash once, or blink, in Step 405. In Step 410 Heat-On Indicator 140 and Set-Temp Indicator 150 are off and Power Switch Circuit 290 is off. In Step 415 Temperature Controller 100 will verify an open thermocouple condition from Amplifier Circuit 260 and update a setpoint value input from Analog Signal Interface 225 through Signal Conditioner Circuit 265. Depending upon the control input signal from On/Off Switch 215 through Control Signal Circuit 255, Temperature Controller 100 will stay in idle mode or run mode. In idle mode, Temperature Controller 100 in Step 420 will monitor Control Signal Circuit 255 for a change to an on condition. Heat-On Indicator 140 and Set-Temp Indicator 150 are both turned off in idle mode.

When Step 420 detects an on condition control input signal from On/Off Switch 215 through Control Signal Circuit 255 indicating run mode, Temperature Controller 100 will in Step 425 calculate a value which is eighty-five percent of the current setpoint and determine if the current process temperature, P_Temp, is below this value. One skilled in the art will recognize that many different percent values other than eighty-five percent may be used depending upon a particular application. If Step 425 determines that the P_Temp is not less than eighty-five percent of the current setpoint value, control jumps to Step 435. If Step 425 determines that the P_Temp is less than eighty-five percent of the current setpoint value, then in Step 430 Temperature Controller 100 will turn on Heat-On Indicator 140 and turn on Power Switch Circuit 290 to fully on at the next zero cross line voltage. Temperature Controller 100 will keep Power Switch Circuit 290 and Heat-On Indicator 140 on until the process temperature rises to the detection temperature, which is eighty-five percent of the setpoint and determined in Step 435, or until Control Signal Circuit 255 changes to an off condition in Step 420. The preset setpoint value is monitored for changes by Signal Conditioner Circuit 265 continuously through Steps 415-435.

If the P-temp is greater than or equal to eighty-five percent of the setpoint as determined in Step 435, Temperature Controller 100 in Step 440 will control through a proportional derivative feature an optimal ratio of AC cycles On to AC cycles Off to get the desired power output to achieve a smooth temperature rise until the current setpoint temperature is reached. Heat-On Indicator 140 will turn on permanently while Power Switch Circuit 290 output condition is at full power, and will flash when Power Switch Circuit 290 output condition is at a burst firing rate. If the P_Temp is not greater than or equal to eighty-five percent of the setpoint in Step 435, control returns to Step 415.

Step 445 determines if the P_Temp is outside a range of ninety-five to one hundred-five percent of the current setpoint value, that is, a range defined on the lower bound as the current setpoint value minus five percent of the current setpoint value, and defined on the upper bound as the current setpoint value plus five percent of the current setpoint value. If outside this range, Temperature Controller 100 in Step 450 will turn on Set-Temp Indicator 150. If the P_Temp is within the range of ninety-five to one hundred-five percent of the current setpoint value, then control jumps to Step 452. One skilled in the art will recognize that many different percent values other than five percent may be used depending upon a particular application.

Step 452 determines if the P_Temp is equal to the current setpoint value. If it is not, then control returns to Step 440. If Step 452 determines that the P_Temp is equal to the current setpoint value, then in Step 454 then Temperature Controller 100 turns off the load output via Power Switch Circuit 290 and Heat-On Indicator 140 is turned off.

Step 455 determines if the P_Temp has risen above one hundred-five percent of the current setpoint value. If not, control jumps to Step 465. If yes, Set-Temp Indicator 150 will begin flashing and Heat-On Indicator 140 will be turned off in Step 460. The current setpoint value is monitored continuously, and if it changes Temperature Controller 100 will update the setpoint value immediately in Step 465. Step 470 determines if the control input signal from On/Off Switch 215 through Control Signal Circuit 255 turns to off. If it does, then control returns to Step 410 where Temperature Controller 100 turns off Heat-On Indicator 140 and Set-Temp Indicator 150 and turns off Power Switch Circuit 290 output. If the control input signal from On/Off Switch 215 through Control Signal Circuit 255 remains on, then Temperature Controller 100 loops back through Steps 435 through 470.

Figure 7:
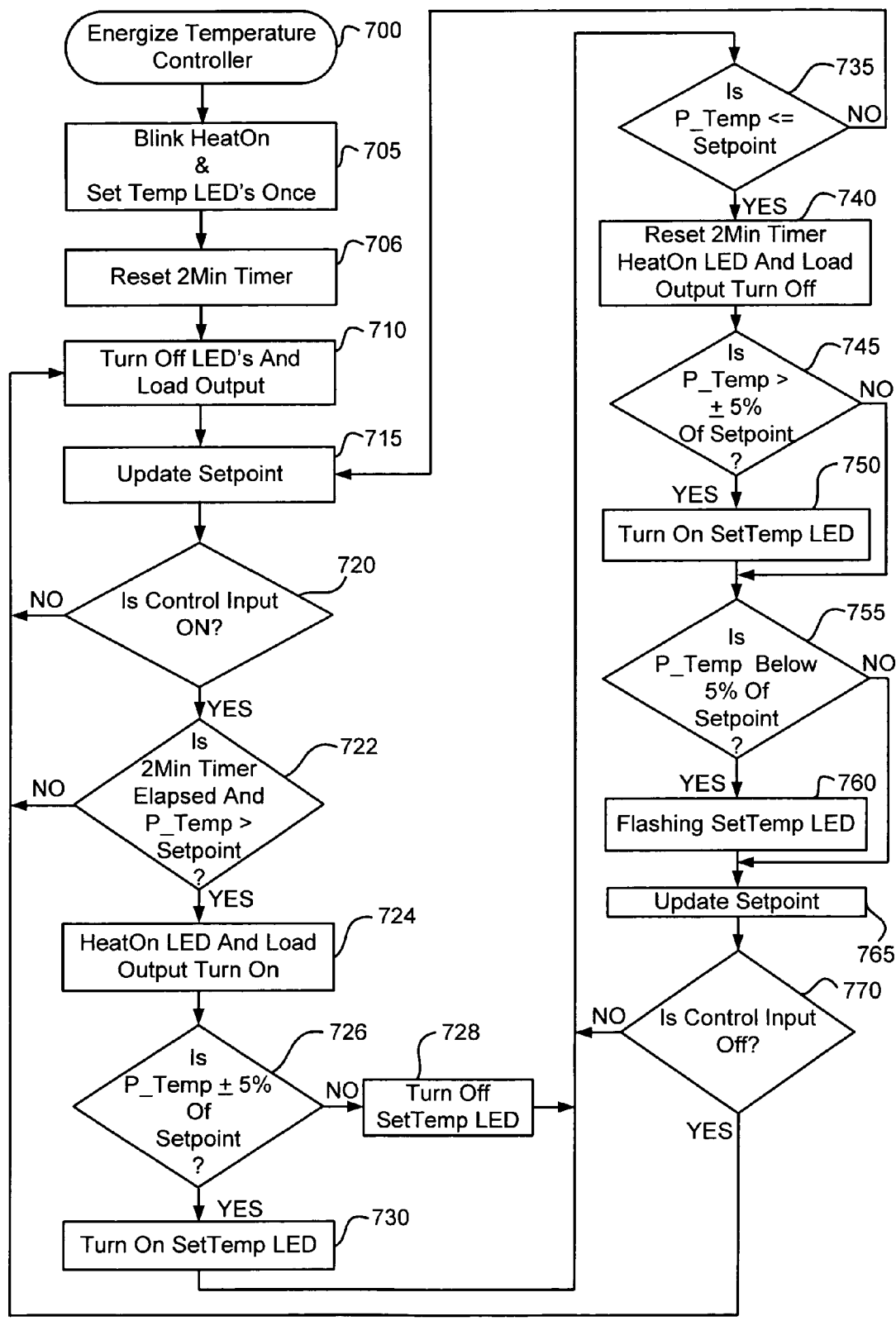
FIG. 7 shows a functional flowchart of an embodiment of the temperature controller for a cooling compressor load of the present invention.

FIG. 7 shows a functional flowchart of an embodiment of the temperature controller for a cooling compressor load of the present invention. Referring now to FIG. 7, in Step 700 Temperature Controller 100 is energized. This causes Heat-On Indicator 140 and Set-Temp Indicator 150 to flash once, or blink, in Step 705. The timer for the two minute short-cycle protection is reset in Step 706. In Step 710 Heat-On Indicator 140 and Set-Temp Indicator 150 are off and Power Switch Circuit 290 is off. In Step 715 Temperature Controller 100 will verify an open thermocouple from Amplifier Circuit 260 and update a setpoint value input from Analog Signal Interface 225 through Signal Conditioner Circuit 265. Depending upon the control input signal from On/Off Switch 215 through Control Signal Circuit 255, Temperature Controller 100 will stay in idle mode or run mode. In idle mode, Temperature Controller 100 in Step 720 will monitor Control Signal Circuit 255 for a change to an on condition. Heat-On Indicator 140 and Set-Temp Indicator 150 are both turned off in idle mode.

When Step 720 detects an on condition control input signal from On/Off Switch 215 through Control Signal Circuit 255 indicating run mode, Temperature Controller 100 will in Step 722 determine if the two minute timer has elapsed, and if the current process temperature, P_Temp, is greater than the current setpoint value. If both conditions are not met, then control returns to Step 710. If both conditions are met, then in Step 724 Temperature Controller 100 will turn on Heat-On Indicator 140 and turn on Power Switch Circuit 290 to fully on at the next zero cross line voltage.

Step 726 determines if the P_Temp is within a range of ninety-five to one hundred-five percent of the current setpoint value, that is, a range defined on the lower bound as the current setpoint value minus five percent of the current setpoint value, and defined on the upper bound as the current setpoint value plus five percent of the current setpoint value. If outside this range, then in step 728 Temperature Controller 100 turns off Set-Temp Indicator 150. If the P_Temp is within this range, then in Step 730 Temperature Controller 100 turns on Set-Temp Indicator 150. One skilled in the art will recognize that many different percent values other than five percent may be used depending upon a particular application.

Step 735 determines if the P-temp is less than or equal to the current setpoint value. If it is not less than or equal to the current setpoint value, control returns to Step 715. If the P-temp is less than or equal to the current setpoint value as determined in Step 735, Temperature Controller 100 in Step 740 resets the two minute timer and turns off the load output via Power Switch Circuit 290.

Step 745 determines if the P_Temp is outside a range of ninety-five to one hundred-five percent of the current setpoint value, that is, a range defined on the lower bound as the current setpoint value minus five percent of the current setpoint value and defined on the upper bound as the current setpoint value plus five percent of the current setpoint value. If outside this range, Temperature Controller 100 in Step 750 will turn on Set-Temp Indicator 150. If the P_Temp is within the range of ninety-five to one hundred-five percent of the current setpoint value, then control jumps to Step 755.

Step 755 determines if the P_Temp has fallen below ninety-five percent of the current setpoint value. If it is not, then control jumps to Step 765. If Step 755 determines that the P_Temp has fallen below ninety-five percent of the current setpoint value, then in Step 760 Temperature Controller 100 will cause Set-Temp Indicator 150 to begin to flash.

The current setpoint value is monitored continuously, and if it changes Temperature Controller 100 will update the setpoint value immediately in Step 765. Step 770 determines if the control input signal from On/Off Switch 215 through Control Signal Circuit 255 turns to off. If it does, then control returns to Step 710 where Temperature Controller 100 turns off Heat-On Indicator 140 and Set-Temp Indicator 150 and turns off Power Switch Circuit 290 output. If the control input signal from On/Off Switch 215 through Control Signal Circuit 255 remains on as determined in Step 770, then Temperature Controller 100 loops back through Steps 735 through 770.

Having described the present invention, it will be understood by those skilled in the art that many changes in construction and circuitry and widely differing embodiments and applications of the invention will suggest themselves without departing from the scope of the present invention.

What is claimed is:

1. A method for controlling the temperature of a process, the method comprising the steps of:
   (a) regulating a direct current received in a temperature controller;
   (b) detecting an on condition and an off condition in said temperature controller;
   (c) amplifying and conditioning an input signal, received from a thermocouple connected to a process, in said temperature controller;
   (d) receiving and updating a setpoint value in said temperature controller;
   (e) generating a temperature control output signal in a processor in said temperature controller;
   (f) receiving said temperature control output signal from said processor in an isolated barrier in said temperature controller; and
   (g) switching said temperature control output signal from said isolated barrier to a load associated with said process.

2. The method according to claim 1 wherein step (b) further comprises the step of:
   detecting said on condition and said off condition in said temperature controller through an on/off switch connectible to said temperature controller.

3. The method according to claim 1 wherein step (d) further comprises the step of:
   receiving and updating said setpoint value through an analog signal interface connectable to said temperature controller.

4. The method according to claim 1 wherein step (e) further comprises the step of:
   generating said temperature control output signal for a heating element load.

5. The method according to claim 1 wherein step (e) further comprises the step of:
   generating said temperature control output signal for a cooling compressor load.

6. The method according to claim 1 wherein step (g) further comprises the step of:
   switching said temperature control output signal to said load through a power switch circuit, wherein said power switch circuit is a solid state relay.

7. The method according to claim 1 further comprising the step of:
   indicating a current operating status of said temperature controller through energizing a heat-on indicator light emitting diode and a set-temp indicator light emitting diode.

8. A temperature controller circuit comprising:
   a processor;
   a regulator circuit connected to said processor that regulates a direct current;
   a control signal circuit connected to said processor that detects an on condition and an off condition;
   an amplifier circuit connected to said processor that amplifies and conditions an input signal from a thermocouple connected to a process;
   a signal conditioner circuit connected to said processor that receives and updates a setpoint value;
   an isolated barrier circuit connected to said processor that receives a temperature control output signal from said processor; and
   a power switch circuit connected to said isolated barrier circuit that switches said temperature control output signal from said processor to a load associated with said process in order to control a temperature of said process.

9. The temperature controller circuit according to claim 8 further comprising:
an isolated direct current supply connectable to said regulator circuit that provides operating power to the temperature controller circuit.

10. The temperature controller circuit according to claim 8 further comprising:
an on/off switch connectable to said control signal circuit to enable and disable said power switch circuit.

11. The temperature controller circuit according to claim 8 further comprising:
an analog signal interface connectable to said signal conditioner circuit to set and update said setpoint value.

12. The temperature controller circuit according to claim 8 wherein said power switch circuit is a solid state relay.

13. The temperature controller circuit according to claim 8 wherein said load is a [sic]one of a heating element load and a cooling compressor load.

14. The temperature controller circuit according to claim 8 further comprising:
a heat-on indicator light emitting diode connected to said processor; and
a set-temp indicator light emitting diode connected to said processor;
wherein said heat-on indicator light emitting diode and said set-temp indicator light emitting diode are controlled by said processor and indicate a current operating status of the temperature controller circuit.

15. The temperature controller circuit according to claim 14 further comprising:
a standard size package for housing said processor, said regulator circuit, said control signal circuit, said amplifier circuit, said signal conditioner circuit, said isolated barrier circuit, said power switch circuit, said heat-on indicator light emitting diode, and said set-temp indicator light emitting diode.

\* \* \* \* \*